United States Patent
Rich et al.

(10) Patent No.: US 8,403,390 B2
(45) Date of Patent: Mar. 26, 2013

(54) VEHICLE PANEL ASSEMBLY AND METHOD OF ATTACHING THE SAME

(75) Inventors: Jonathan E. Rich, Clinton Township, MI (US); Marcel R. Cannon, Romeo, MI (US); Terry A. Swartzell, Ann Arbor, MI (US); Andrew W. White, Shelby Township, MI (US); Kenneth D. Schmid, Northville, MI (US); James F. Keys, Northville, MI (US); Jonathan W. Fisk, Canton, MI (US); Stephen A. Fetsko, Medina, OH (US); James J. Evangelista, Northville, MI (US)

(73) Assignees: Shiloh Industries, Inc., Valley City, OH (US); GM Global Technology Operations LLC, Detroit, MI (US)

( * ) Notice: Subject to any disclaimer, the term of this patent is extended or adjusted under 35 U.S.C. 154(b) by 22 days.

(21) Appl. No.: 13/044,978

(22) Filed: Mar. 10, 2011

(65) Prior Publication Data

US 2012/0228899 A1   Sep. 13, 2012

(51) Int. Cl.
*B23K 31/02* (2006.01)
*B62D 25/14* (2006.01)
*B62D 65/14* (2006.01)

(52) U.S. Cl. ....... 296/29; 219/117.1; 228/174; 296/39.3

(58) Field of Classification Search ............. 156/153, 156/252, 256, 291; 219/91.2, 91.21, 91.23, 219/117.1, 118; 228/141.1, 164, 170, 172, 228/173.1, 173.2, 173.3, 173.6, 174; 296/29, 296/70, 39.3
See application file for complete search history.

(56) References Cited

U.S. PATENT DOCUMENTS

| 2,237,623 | A | | 4/1941 | Ledwinka |
| 2,815,436 | A | * | 12/1957 | Bland ............................. 219/74 |
| 2,985,747 | A | * | 5/1961 | Kutchera ................... 219/137 R |
| 3,649,430 | A | | 3/1972 | Lewis et al. |
| 3,800,118 | A | * | 3/1974 | Wefers et al. .............. 219/91.21 |
| 4,223,073 | A | | 9/1980 | Caldwell et al. |
| 4,655,496 | A | | 4/1987 | Gahlau et al. |
| 4,705,139 | A | | 11/1987 | Gahlau et al. |
| 4,791,765 | A | * | 12/1988 | Noggle ........................ 52/309.2 |
| 4,851,271 | A | | 7/1989 | Moore, III et al. |
| 5,143,755 | A | | 9/1992 | Moore, III et al. |
| 5,180,189 | A | * | 1/1993 | Moreno ........................ 280/779 |

(Continued)

FOREIGN PATENT DOCUMENTS

| JP | 52062815 A | * | 5/1977 |
| JP | 57142780 A | * | 9/1982 |

(Continued)

*Primary Examiner* — Glenn Dayoan
*Assistant Examiner* — Paul Chenevert
(74) *Attorney, Agent, or Firm* — Reising Ethington P.C.

(57) ABSTRACT

A sound-damped vehicle panel assembly, such as a dash panel, is attached to a structural member with one or more weld joints. The vehicle panel assembly may include a main panel member, a sound-damping patch, and a sound-damping adhesive layer arranged therebetween, where the patch covers at least a portion of an acoustically active region of the main panel member. The weld joints that attach the vehicle panel assembly to the structural member are preferably located at weld openings formed in the sound-damping patch and/or the sound-damping adhesive layer so that the weld joint can be formed without melting and vaporizing the adhesive during the welding operation, as such an operation would likely require additional ventilation equipment and could impact the quality of the weld joint.

22 Claims, 2 Drawing Sheets

U.S. PATENT DOCUMENTS

| | | | |
|---|---|---|---|
| 5,195,795 A | 3/1993 | Cannera et al. | |
| 5,233,832 A | 8/1993 | Moore, III | |
| 5,271,142 A | 12/1993 | Moore, III et al. | |
| 5,282,917 A * | 2/1994 | Danelski | 156/277 |
| 5,347,810 A | 9/1994 | Moore, III | |
| 5,407,034 A | 4/1995 | Vydra et al. | |
| 5,416,962 A | 5/1995 | Passarella | |
| 5,418,073 A | 5/1995 | Loth et al. | |
| 5,557,078 A | 9/1996 | Holwerda | |
| 5,580,122 A * | 12/1996 | Muehlhausen | 296/193.02 |
| 5,590,524 A | 1/1997 | Moore, III et al. | |
| 5,631,451 A | 5/1997 | Torisaka et al. | |
| 5,796,055 A | 8/1998 | Benson, Jr. et al. | |
| 5,842,686 A | 12/1998 | Hansen et al. | |
| 5,851,342 A | 12/1998 | Vydra et al. | |
| 5,975,609 A | 11/1999 | Campbell | |
| 5,979,964 A | 11/1999 | Ban et al. | |
| 6,024,190 A | 2/2000 | Ritzema | |
| 6,036,797 A * | 3/2000 | Kanazawa et al. | 156/82 |
| 6,089,349 A | 7/2000 | Aye | |
| 6,092,854 A | 7/2000 | Campbell | |
| 6,103,152 A | 8/2000 | Gehlsen et al. | |
| 6,109,481 A | 8/2000 | Alexander et al. | |
| 6,179,372 B1 * | 1/2001 | Sakamoto et al. | 296/203.02 |
| 6,202,462 B1 | 3/2001 | Hansen et al. | |
| 6,283,541 B1 * | 9/2001 | Kim | 296/210 |
| 6,302,466 B1 | 10/2001 | Zwick | |
| 6,368,438 B1 | 4/2002 | Chang et al. | |
| 6,375,255 B1 | 4/2002 | Maruta et al. | |
| 6,435,590 B2 | 8/2002 | Miyahara et al. | |
| 6,455,146 B1 | 9/2002 | Fitzgerald | |
| 6,465,110 B1 | 10/2002 | Boss et al. | |
| 6,481,545 B1 | 11/2002 | Yano et al. | |
| 6,585,068 B2 * | 7/2003 | Matsushita | 180/90 |
| 6,589,607 B1 | 7/2003 | Edwards et al. | |
| 6,592,968 B1 | 7/2003 | Schmit et al. | |
| 6,601,909 B2 * | 8/2003 | Obara et al. | 296/191 |
| 6,621,658 B1 | 9/2003 | Nashif | |
| 6,722,720 B2 | 4/2004 | Donick et al. | |
| 6,805,219 B2 | 10/2004 | Yasuda et al. | |
| 6,827,394 B2 | 12/2004 | Watanabe et al. | |
| 6,869,138 B2 | 3/2005 | Rhodes et al. | |
| 7,040,691 B1 | 5/2006 | Jacobs et al. | |
| 7,048,330 B2 | 5/2006 | Daniel | |
| 7,070,848 B2 | 7/2006 | Campbell | |
| 7,094,478 B1 | 8/2006 | Griffey et al. | |
| 7,121,609 B2 | 10/2006 | Tame | |
| 7,125,613 B1 | 10/2006 | Tullis et al. | |
| 7,172,800 B2 | 2/2007 | Boss | |
| 7,186,442 B2 | 3/2007 | Myers et al. | |
| 7,218,189 B2 | 5/2007 | Pahl | |
| 7,219,946 B2 | 5/2007 | Tame et al. | |
| 7,288,290 B2 | 10/2007 | Chao et al. | |
| 7,291,241 B2 | 11/2007 | Dunlap | |
| 7,325,865 B2 * | 2/2008 | Yamazaki | 296/203.04 |
| 7,360,520 B2 | 4/2008 | Tullis et al. | |
| 7,364,221 B2 | 4/2008 | Tahri et al. | |
| 7,393,575 B2 | 7/2008 | Boss | |
| 7,429,713 B2 * | 9/2008 | Wang et al. | 219/86.9 |
| 7,444,874 B2 | 11/2008 | Goetchius | |
| 7,484,785 B2 | 2/2009 | Weber | |
| 7,585,559 B2 | 9/2009 | Schroeder et al. | |
| 7,748,184 B1 | 7/2010 | Wheeler et al. | |
| 7,784,165 B2 | 8/2010 | Xiao et al. | |
| 7,819,452 B2 * | 10/2010 | Fuchs et al. | 296/29 |
| 7,828,357 B2 * | 11/2010 | Hayashi et al. | 296/29 |
| 7,834,292 B2 * | 11/2010 | Wang et al. | 219/93 |
| 7,919,174 B2 | 4/2011 | Ruokolainen et al. | |
| 7,985,317 B2 * | 7/2011 | Himuro et al. | 156/307.5 |
| 2004/0007891 A1 * | 1/2004 | Aota et al. | 296/29 |
| 2004/0018353 A1 | 1/2004 | Czaplicki et al. | |
| 2004/0058181 A1 | 3/2004 | Garnault et al. | |
| 2004/0076841 A1 | 4/2004 | Sauer et al. | |
| 2004/0110905 A1 | 6/2004 | Kubota et al. | |
| 2004/0129493 A1 | 7/2004 | Campbell | |
| 2004/0138321 A1 | 7/2004 | Hashimoto et al. | |
| 2004/0157079 A1 | 8/2004 | Cittadini | |
| 2004/0214008 A1 | 10/2004 | Dobrusky et al. | |
| 2005/0019590 A1 | 1/2005 | Josefsson | |
| 2006/0134449 A1 | 6/2006 | Sigler et al. | |
| 2006/0137944 A1 | 6/2006 | Denys | |
| 2006/0169341 A1 | 8/2006 | Goetchius et al. | |
| 2006/0169557 A1 | 8/2006 | Goetchius | |
| 2006/0266385 A1 | 11/2006 | Malaker | |
| 2007/0186614 A1 | 8/2007 | Pinard | |
| 2007/0197713 A1 | 8/2007 | Miyawaki et al. | |
| 2008/0236739 A1 | 10/2008 | Ashley | |
| 2008/0245126 A1 | 10/2008 | Huther | |
| 2008/0246312 A1 * | 10/2008 | Katoh | 296/203.04 |
| 2008/0248274 A1 | 10/2008 | Hierholz | |
| 2009/0127026 A1 | 5/2009 | Mandos et al. | |
| 2009/0142538 A1 | 6/2009 | Sigler et al. | |
| 2009/0183821 A1 | 7/2009 | Schroeder et al. | |
| 2009/0249627 A1 | 10/2009 | Xiao | |
| 2009/0252989 A1 | 10/2009 | Swanson et al. | |
| 2009/0269562 A1 | 10/2009 | Roelofs et al. | |
| 2010/0013255 A1 | 1/2010 | Mantovani et al. | |
| 2010/0132110 A1 | 6/2010 | Schwaegler | |

FOREIGN PATENT DOCUMENTS

| | | | |
|---|---|---|---|
| JP | 57187187 A * | 11/1982 | |
| JP | 01209200 A * | 8/1989 | |
| JP | 05185956 A * | 7/1993 | |

* cited by examiner

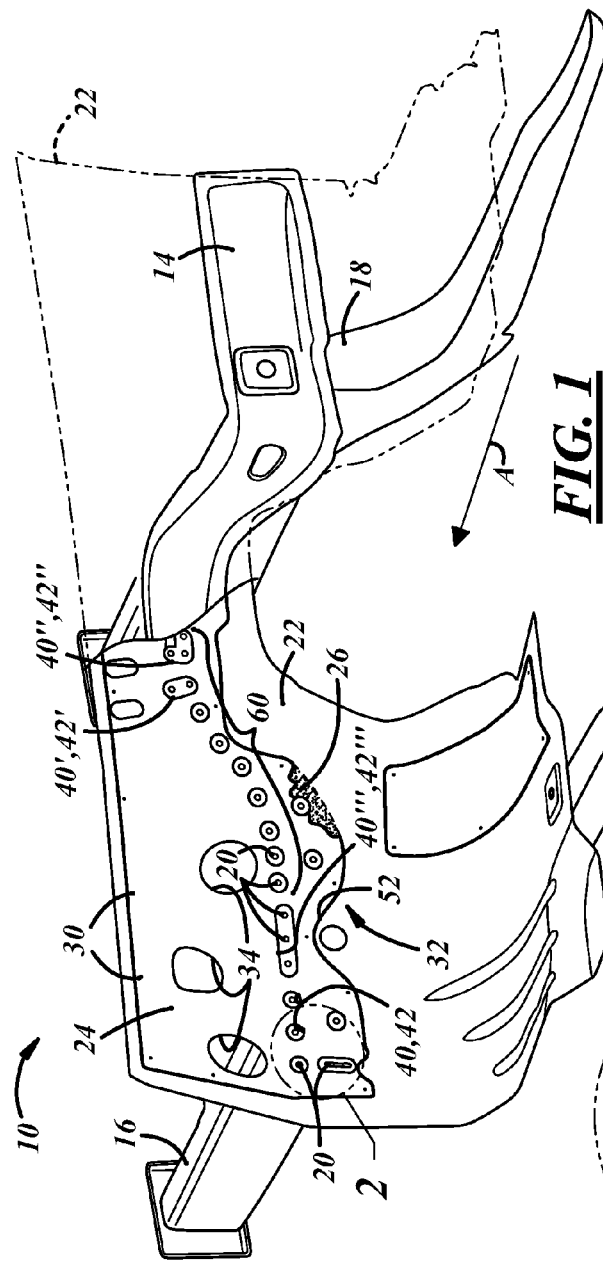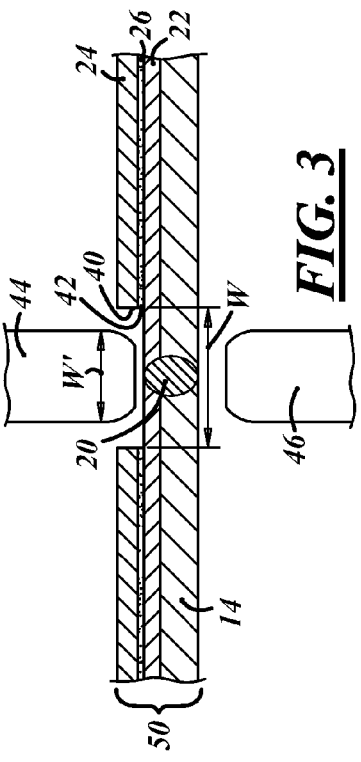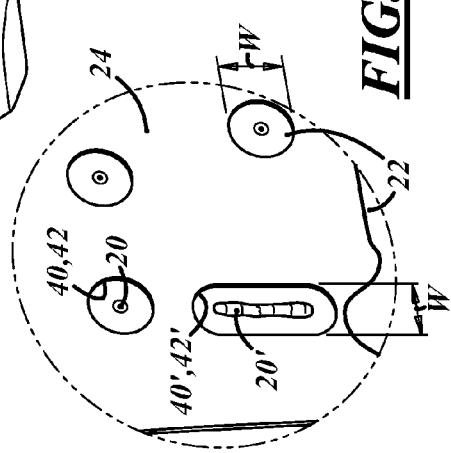

VEHICLE PANEL ASSEMBLY AND METHOD OF ATTACHING THE SAME

TECHNICAL FIELD

The present disclosure generally relates to vehicle panels and, more particularly, to sound-damped vehicle panel assemblies, like those used in vehicle dash panels.

BACKGROUND

Passenger vehicles may utilize a variety of different structures or techniques to limit, minimize, or otherwise reduce the amount of sound transmitted from locations outside of the passenger cabin to its interior. Minimizing the noise or acoustic vibrations that certain vehicle components emit is one technique. For example, engines, transmissions, exhaust systems, tires, or other components may be designed to be relatively quiet when in use so that passenger cabin noise is lessened. Another technique is to provide components that attenuate vibrations that would otherwise reach the passenger cabin by absorbing and/or dissipating vibrational energy, for example. Various attributes can affect the acoustic properties of such vibration-attenuating components, including their overall mass, composition, density, stiffness, thickness and location, to name a few.

SUMMARY

According to one embodiment, there is provided a vehicle panel assembly that may include a main panel member, a sound-damping layer, and a weld joint. The main panel member is attached to a structural member of a vehicle and has an acoustically active region. The sound-damping layer is adhered to the main panel member and has at least one weld opening. The weld joint is formed in the weld opening of the sound-damping layer and includes material from the structural member of the vehicle and the main panel member without including material from the sound-damping layer.

According to another embodiment, there is provided a vehicle panel assembly that may include a main panel member, a sound-damping adhesive layer, a sound-damping patch, and a weld joint. The main panel member contacts a structural member of the vehicle, the sound-damping adhesive layer contacts the main panel member and has a first weld opening, the sound-damping patch contacts the sound-damping adhesive layer and has a second weld opening that is aligned with the first weld opening, and the weld joint is at least partially surrounded by the first and second weld openings in the sound-damping layer and the sound-damping patch.

According to another embodiment, there is provided a method of attaching a vehicle panel assembly to a structural member of a vehicle. The method may comprise the steps of: (a) providing a vehicle panel assembly that has a main panel member, an adhesive layer and a sound-damping patch, wherein at least one of the adhesive layer or the sound-damping patch includes a weld opening; (b) locating the vehicle panel assembly on the structural member of the vehicle so that the weld opening is aligned with the structural member; and (c) welding the vehicle panel assembly to the structural member of the vehicle with at least one weld joint, wherein the weld joint is located in the weld opening and is formed with material from the main panel member and the structural member.

BRIEF DESCRIPTION OF THE DRAWINGS

Preferred exemplary embodiments will hereinafter be described in conjunction with the appended drawings, wherein like designations denote like elements, and wherein:

FIG. 1 is a perspective view of an exemplary sound-damped vehicle panel assembly, where the vehicle panel assembly has been partially cut away to illustrate how it is attached or mounted to a structural member of the vehicle;

FIG. 2 is an enlarged view of a portion of the vehicle panel assembly of FIG. 1, showing various types of exemplary weld openings and weld joints;

FIG. 3 is a cross-sectional view of a portion of the vehicle panel assembly of FIG. 1, showing the vehicle panel assembly being welded to a vehicle structural member.

DETAILED DESCRIPTION OF THE EMBODIMENTS

Figure 4:
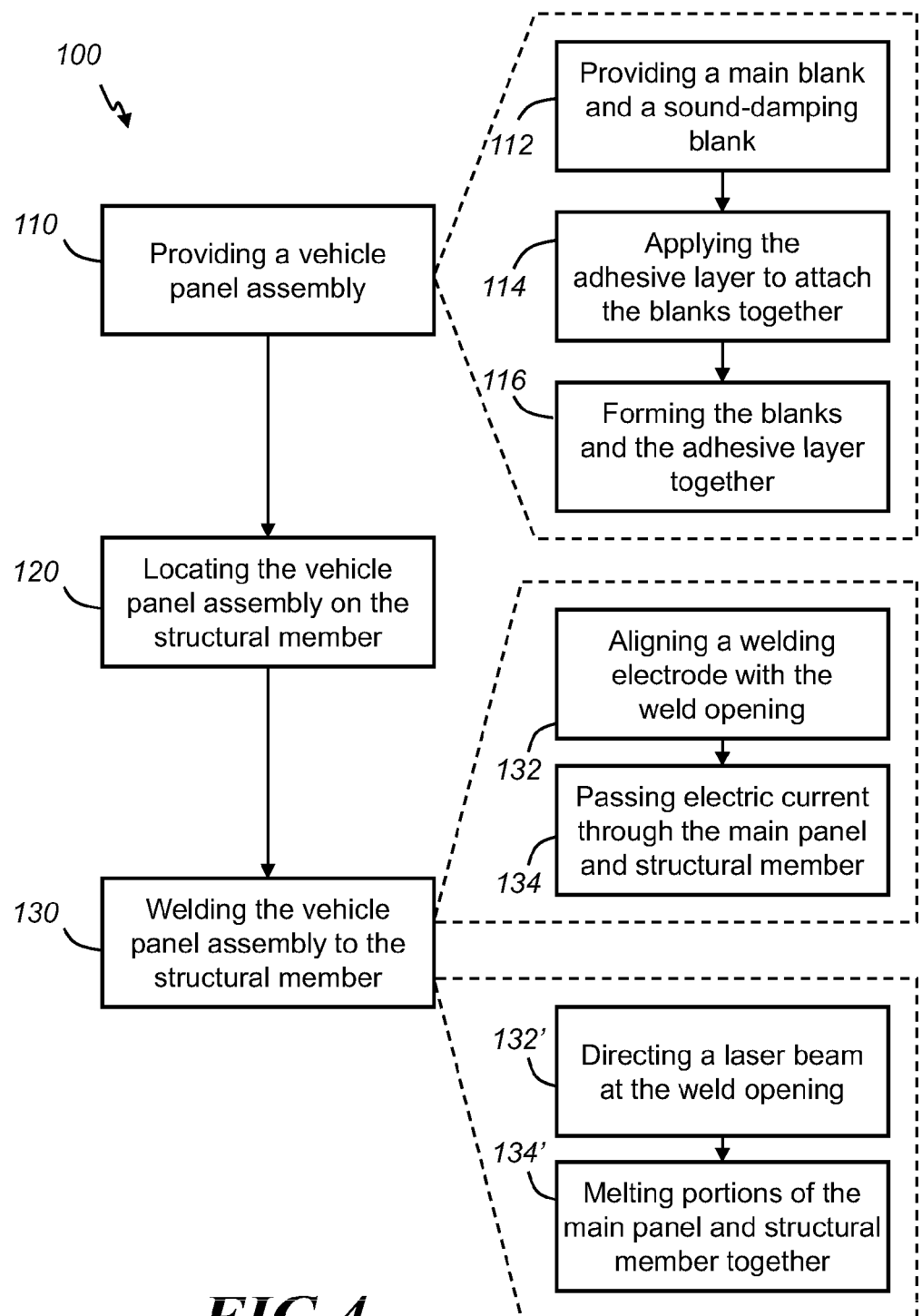
FIG. 4 is a flowchart illustrating an exemplary method of attaching a vehicle panel assembly to a vehicle structural member, such as the panel assembly and the structural member of FIG. 1.

Sound and/or vibrations in a vehicle can be reduced through the use of sound-damping components. Sound-damping components may include materials that transform vibrational energy into some other form of energy so that the sound and/or vibrations are reduced before reaching a location where they are undesirable, such as inside a passenger cabin. For instance, some viscoelastic materials can transform vibrational energy into thermal energy due to their combination of viscous and elastic properties—i.e., their viscous properties allow them to flow and thereby effectively absorb mechanical energy and transform it to thermal energy or heat, while their elastic properties allow them to vibrate and to be solid materials. Of course, materials other than viscoelastic materials may also be used to transform or otherwise attenuate sound and/or vibrations in a vehicle.

It is possible that the desired location for a sound-damping component will overlap with the attachment location of that component, such that component-to-component attachment occurs in the same area as the sound-damping material. Where joining techniques, such as welding, are used to attach the components together, the presence of the sound-damping material may present some difficulties. For example, if a sound-damped dash panel having a layer of viscoelastic material is welded to a structural cross-member, the component-to-component weld may have to pass through the viscoelastic material. Viscoelastic materials typically have melting and vaporization temperatures that are much lower than that of the corresponding components, which are usually made of metal. Thus, the viscoelastic material may vaporize during the welding process and produce smoke and/or other unwanted gases, potentially necessitating additional venting equipment to remove the vapors from the immediate work area, for example. Additionally, such out-gassing can negatively affect the strength or other attributes of the weld by causing localized voids in the weld materials or otherwise impacting the weld quality.

By providing weld openings in one or more layers of a sound-damped vehicle panel assembly and by locating weld joints at such weld openings, as described herein, conventional welding techniques may be used to attach sound-damped vehicle panel assemblies to other vehicle components without the need for additional venting equipment and without compromising weld joint quality. The vehicle panel assembly described herein may be used in any number of different applications in order to reduce noise and/or vibrations, provide thermal insulation, and/or improve the structural integrity of the underlying part. Although the vehicle panel assembly is described below in the context of a vehicle dash panel, it should be appreciated that it is not so limited and may be used with various vehicle and non-vehicle applications. Some potential examples include aerospace applications, marine applications, military applications, farm and construction equipment, recreational vehicles, home appliances, as well as any other application where it is desirable to reduce noise or vibrations in a component. Other potential vehicle applications for the sound-damped vehicle panel assembly include wheel wells, seat tubs, spare wheel tubs, plenums, cowls, roof panels, floor pans, hoods, deck lids, door inners, parcel shelves, oil pans, covers and housings for various engine and transmission components, etc.

With reference to FIG. 1, there is shown a cut-away view of an exemplary vehicle panel assembly 10 attached to one or more structural members 14-18 of a vehicle. In this particular embodiment, vehicle panel assembly 10 is part of a dash panel that separates the passenger cabin from the engine compartment and is located toward the front of the vehicle, where arrow A of FIG. 1 points in the direction of the front of the vehicle. Vehicle panel assembly 10 has been cut-away (denoted by broken lines) to illustrate the underlying structural members 14, 18. Vehicle panel assembly 10 may include a main panel member 22, a sound-damping patch 24, a sound-damping adhesive layer 26, and a number of weld joints 20 that attach the vehicle panel assembly to one or more structural members of the vehicle. Sound-damping layer adhesive 26 may be used to adhere sound-damping patch 24 to main panel member 22 and to provide the vehicle panel assembly with certain sound-damping qualities. By using sound-damping patch 24, as opposed to a full sound-damping laminate, the vehicle panel assembly is able to enjoy weight and/or cost savings, yet still provide acceptable sound-damping performance. Sound-damping patch 24 may provide vehicle panel assembly 10 with other non-sound-damping qualities as well, including those that improve the structural and/or thermal attributes of the assembly.

Structural cross member 14 is part of the vehicle chassis and spans the width of the vehicle so that it can connect structural members 16, 18 together, which in this case are side rails that extend in the lengthwise direction of the vehicle. Structural cross member 14 may serve various functions, such as providing stiffness to the overall vehicle structure and providing attachment points for other vehicle components, like vehicle panel assembly 10. Skilled artisans will appreciate that structural members 14-18 may be formed from various metals or other suitably strong materials, and may be welded or otherwise securely attached to one another via a variety of suitable attachment means. The material thickness of structural members 14-18 may be greater than that of vehicle panel assembly 10 or other components that are attached to the structural members, due to their need to support or withstand higher loads. It should be appreciated that the example shown in FIG. 1 is non-limiting, as vehicle panel assembly 10 may be attached to any number of structural members and is not limited to the exemplary arrangement illustrated here. Structural members 14-18 need not be a part of the overall vehicle chassis and may be provided for the specific purpose of supporting components, such as vehicle panel assembly 10.

Main panel member 22 acts as the structural foundation for the vehicle panel assembly and can be blanked, cut, sheared or otherwise formed into a desired shape. Main panel member 22 is typically larger than sound damping patch 24 and may be made from any number of suitable materials, including various types and alloys of steel (e.g., cold rolled steel, hot dipped steel, electro-galvanized steel, galvanneal, etc.) and aluminum. In certain exemplary embodiments, main panel member 22 is made from steel and has a thickness between 0.4 mm-3.0 mm. However, the exact size, shape, thickness and composition of the main panel member are largely driven by the particular part that is being formed, and certainly may differ from the exemplary embodiments shown and described here. In this particular embodiment, main panel member 22 forms the foundation of a vehicle dash panel and includes one or more acoustically active regions 32 and pass throughs 34, which can accommodate components such as steering columns, wiring harnesses, HVAC devices, or other components that need to extend from one side of the vehicle panel assembly to the other.

An "acoustically active region," as used herein, broadly includes any section, portion and/or other region of the main panel member that is exposed to a sound and/or vibration source and can benefit from some type of sound-damping. To illustrate, acoustically active region 32 may cover the entire main panel member 22, or it may cover only portions or sections of the main panel member. It is also possible for acoustically active region 32 to be subjected to various levels of sound and/or vibrations, with some sub-regions being exposed to higher levels than others. For example, in the exemplary embodiment of FIG. 1, the acoustically active region 32 may extend across the entire main panel member 22 due to the fact that the entire dash panel is subjected to sound and/or vibrations from the engine compartment; or the acoustically active region may only extend in the upper portion of the main panel member where the main panel member is most affected by the sound and/or vibrations from the engine compartment. The size and location of the acoustically active region is largely based on the particular implementation at hand. It should be appreciated, however, that the engine compartment is not the only potential sound and/or vibration source, as other possibilities may include various drive train components, wheels and tires, and wind noise, to name but a few.

Sound-damping patch 24 is attached to main panel member 22 to help attenuate sound and/or vibrations at the acoustically active region or regions of the main panel member. Sound-damping patch 24 covers or overlaps at least a portion of one or more acoustically active regions, such as region 32, and may include one or more weld openings 40, as will be subsequently explained in more detail. According to one exemplary embodiment, sound-damping patch 24 is adhered to main panel member 22 with sound-damping adhesive layer 26 and is constructed from any number of suitable materials, including various types and alloys of steel (e.g., cold rolled steel, hot dipped steel, electro-galvanized steel, galvanneal, etc.) and aluminum. For example, sound-damping patch 24 may have a thickness or gauge that is thinner than that of the underlying main panel member 22 and is between 0.2 mm-2.0 mm. However, the exact size, shape, thickness and composition of the patch can certainly differ from the exemplary embodiments shown and described here. In this embodiment, sound-damping patch 24 is smaller than main panel member 22, but it could be the same size as the main panel member in certain applications. A sound-damping patch that is smaller than the main panel member may allow tailored management of the acoustic properties of the overall panel assembly 10 by being present only in the desired areas, which typically correspond to the most acoustically active regions of main panel member 22. Such a sound-damping patch may result in significant weight, material and/or cost savings and may also improve the formability of vehicle panel assembly 10 in some instances. Sound-damping patch 24 is shown attached to the side of main panel member 22 that faces toward the passenger cabin, but it may be attached to the opposite side of panel member 22 that faces the engine compartment, or a patch may be attached to both sides of main panel member 22.

Sound-damping layer 26 is located between main panel member 22 and sound-damping patch 24 and, in one embodiment, includes a sound-damping adhesive for attaching the patch to the main panel. It is preferable that sound-damping layer 26 cover or overlap at least a portion of one or more acoustically active regions, such as region 32, so that sound-damping patch 24 may be applied to those areas. According to one exemplary embodiment, sound-damping layer 26 is a viscoelastic adhesive layer that is comprised of an acrylate-based thermoset resin and has a thickness of about 0.005 mm to 0.05 mm; however, other adhesive compositions and thicknesses may be used as well. Vehicle panel assembly 10—with its main panel member 22, sound-damping patch 24 and sound-damping layer 26—may operate in a constrained damping layer capacity. Skilled artisans will appreciate that constrained damping layer constructions can dissipate or otherwise mitigate vibrational energy by utilizing shear and strain within the sandwich-like construction to convert vibrations into low-grade frictional heat. Alternatively or additionally, one or more spot welds 30 may be included to strengthen the attachment or lamination of the sound-damping patch to the main panel member. Other means such as fasteners, crimps, rivets, etc. may also be used for this purpose. Like sound-damping patch 24, the sound-damping layer 26 may also include one or more weld openings 42.

Weld openings 40, 42 may include holes, windows, cutouts, notches and/or other openings in sound-damping patch 24 and/or sound-damping layer 26, and are designed to accommodate one or more weld joints 20. As best illustrated in the weld stack up 50 shown in FIG. 3, weld opening 40 is formed in sound-damping patch 24, weld opening 42 is formed in sound-damping layer 26, and both of these weld openings are aligned with one another so that a weld joint 20 may be formed with materials from structural member 14 and main panel member 22 without including material from the sound-damping patch or layer. If the weld joint passed through sound-damping layer 26, for example, fumes and other gaseous by-products would be formed that may require venting and removal. Thus, weld openings 40, 42 help remove sound-damping patch 24 and sound-damping layer 26 from weld stack up 50 and thereby potentially improve the manufacturing process as well as the quality of the weld joint. It is possible for vehicle panel assembly 10 to include weld openings in sound-damping patch 24 only, sound-damping layer 26 only, or both. In the case of weld openings being formed in the sound-damping layer but not in the patch, the weld joint may include material from structural member 14, main panel member 22, and sound-damping patch 24. Weld openings 40, 42 may be apertures located within the interior of sound-damping patch 24 and/or layer 26 (i.e., located inside of the perimeter of the patch such that they completely surround a corresponding weld joint), or they may be notches or other irregularities located along an edge or perimeter of sound-damping patch 24 and/or layer 26 (e.g., see weld opening 52). Weld openings 40, 42 may be generally circular in shape, they may be elongated or oblong in shape (e.g., see weld openings 40', 42'), or they may be arranged according to some other configuration (e.g., see weld openings 40", 42" which is generally L-shaped). It is noted that reference numerals 40, 42 are used to refer to all shapes of weld openings and are not intended to be limited to one particular shape.

Weld joint 20 is an attachment between two or more layers of vehicle panel assembly, typically between a structural member 14-18 and main panel assembly 22. The weld joints 20 may be formed by localized melting of at least one of the materials and/or by introducing an additional material (such as the case in brazing or welding that involves a consumable electrode) such that the materials fuse together. A typical weld joint is formed by heating portions of two pieces of metal to a molten state, pressing them together, and cooling them so that the joint includes a mixture of metal from both pieces. The heating may occur by the application of an external heat source (e.g., a laser) or by electric current flow between the pieces, to cite two examples. Each of the weld joints 20 may include a spot weld, a continuous weld, or some other type of welded joint. Spot welds are generally round and may be formed by electric resistance welding, laser welding, drawn-arc stud welding, or some other suitable method known in the art. Continuous welds are generally elongated (e.g., either linear or curvi-linear) and may be formed by laser welding, MIG (metal inert gas) or TIG (tungsten inert gas) welding, or some other suitable method known to skilled artisans. It should be appreciated that weld joints 20 are not limited to any particular type of welded joint or technique.

In the exemplary embodiment of FIG. 1, a plurality of weld openings 40, 42 are arranged in a pattern 60 that follows or otherwise lines up with the shape of structural member 14. This enables vehicle panel assembly 10 to be securely attached to structural member 14 through a series of weld joints or connection points that follow along the widthwise extent of the structural member. Each one of the weld openings 40, 42 in pattern 60 accommodates a weld joint 20 that is formed with materials from structural member 14 and main panel member 22 without including material from sound-damping layer 26. It is not necessary for pattern 60 to uniformly extend with equal spacing between weld openings, as the pattern or arrangement of weld openings may be specifically designed to meet the structural and attachment needs of the particular application at hand.

Referring now to FIG. 2, a portion of vehicle panel assembly 10 is shown in greater detail and illustrates several different weld opening embodiments and co-located weld joints. In one potential embodiment, weld openings 40, 42 are generally circular in shape and accommodate a spot weld 20. In a different embodiment, weld openings 40', 42' are generally elongated in shape and accommodate a continuous weld 20', such as one that is linear or curvilinear. The particular shape and size of the weld openings may be customized or tailored to the desired number and/or types of weld joints that they are meant to accommodate, and can certainly differ from the exemplary ones shown here. For example, the L-shaped weld openings 40", 42" of FIG. 1 can accommodate the three spot welds shown, or they can be modified to accommodate some other combination of spot and/or continuous welds. In yet another embodiment, weld openings 40''', 42''' are designed to accommodate a number of weld joints within a single weld opening, and may be circular, elongated or of another shape.

Weld opening sizes and shapes may depend on several factors, including the dimensions of the welding equipment used to form the weld joints. Generally, each weld opening is sized as small as possible in order to accommodate the particular welding equipment used, yet maximize the amount of sound-damping material in the acoustically active region. Weld openings 40, 42 may have certain dimensions that are related or tied to corresponding welding equipment dimensions. For example, weld openings 40, 42 may be defined by a dimensional ratio ranging from 1.2 to 5.0, inclusive, where the dimensional ratio represents an inner dimension W of the weld opening divided by an outer dimension W' of a corresponding welding electrode. Examples of an inner dimension W are illustrated in FIGS. 2 and 3, and are generally representative of the minimum interior width or dimension of a weld opening. Put differently, the inner dimension W is equal to the diameter of the largest circle that will fully fit within the perimeter of the weld opening 40, 42. Where the weld opening is in the form of a notch along the perimeter, such as weld opening 52, the inner dimension W is equal to the diameter of the largest circle that will fit within the notch. In the case of circular weld openings 40, 42, the inner dimension W is simply equal to the inner diameter of the weld opening. For elongated weld openings 40', 42', the inner dimension W is equal to its slot-width, as shown, which corresponds to the diameter of the largest circle that fits within the slot. The outer dimension W' of the welding electrode refers to the maximum outer dimension of the electrode and is described below in further detail.

FIG. 3 is a cross-section of vehicle panel assembly 10, and shows an exemplary weld joint 20, weld openings 40, 42, as well as the welding equipment that is used to form the weld joint. In this example, the welding equipment includes first and second welding electrodes 44, 46 that are used to form the weld joint 20 by resistance spot welding. Each exemplary electrode 44, 46 includes an outer dimension W', which is the maximum width of the electrode at the working end that forms the weld joint. Welding electrodes are typically round in cross-section, making the outer dimension W' simply equal to the diameter at or near the welding end, but other cross-sectional shapes are possible. In instances where weld joints 20 are formed by resistance welding electrodes, the dimensional ratio may range from about 1.2 to about 5.0, inclusive, and preferably from about 1.5 to about 3.0. For example, for a particular welding electrode having an outer dimension W' equal to 10 mm, the corresponding weld opening can range in width from about 12 mm to about 50 mm, inclusive. The precise dimensional ratio may be influenced by factors such as the repeatability and accuracy of the welding equipment with respect to its location on the work pieces. According to one example, weld opening 40, 42 has an inner dimension of about 25 mm in order to accommodate a welding electrode with an outer dimension of about 10 mm to 12 mm. Thus, the weld joint is surrounded by the weld opening in a way that ensures sufficient sound-damping performance, yet provides the welding electrode with enough clearance to account for manufacturing tolerances so that the welding electrodes do not contact the side walls of the opening during the welding process.

Turning now to FIG. 4, there is shown an exemplary embodiment for a method 100 of attaching a vehicle panel assembly, such as panel assembly 10, to a structural member of a vehicle. Exemplary method 100 generally includes the steps of providing a vehicle panel assembly, locating the panel assembly on the structural member, and welding the panel assembly to the structural member.

Step 110 includes providing a vehicle panel assembly having a main panel member, an adhesive layer and a sound-damping patch. At least one of the adhesive layer or the sound-damping patch includes a weld opening such as one of those described above. Of course, more than one weld opening may be included in the adhesive layer and/or the sound-damping patch, and the panel assembly can include more than one sound-damping patch and/or adhesive layer. Each of the sound-damping patch and the adhesive layer may be provided with or without weld openings. In an exemplary embodiment, step 110 provides a vehicle panel assembly 10 that includes a main panel member 22, an adhesive layer 26 and a sound-damping patch 24, where both the adhesive layer and the sound-damping patch have weld openings that are aligned with one another, as illustrated in FIG. 3.

Step 110 may optionally include the exemplary sub-steps of providing a main blank and a sound-damping blank, applying the adhesive layer to attach the blanks together, and forming the blanks and the adhesive layer together into the vehicle panel assembly, as shown in FIG. 4. For example, sub-step 112 includes providing the main blank and the sound-damping blank. The sound-damping blank may be smaller than the main blank and, depending on the embodiment, may already include one or more weld openings. The sound-damping blank and the main blank will ultimately become the sound-damping patch and the main panel member, respectively. Each blank may be fabricated using conventional stamping or other techniques to provide blanks having the desired shapes and sizes and, in the case of the sound-damping blank, the desired shapes, sizes, locations, patterns and number of weld openings.

Sub-step 114 includes applying the adhesive layer to a rear surface of the sound-damping blank so that there is no adhesive in the area of the weld opening. The adhesive layer may then be used to attach the sound-damping blank to the main blank at a desired location—typically corresponding with an acoustically active region of the main panel member. The adhesive layer can be applied using a variety of techniques, including but not limited to spraying, coating, rolling, solvent casting, providing them in situ, or other adhesive application methods. In embodiments having one or more weld openings the sound-damping blank, when the adhesive layer is applied to the rear surface of the sound-damping blank (e.g., by spraying or rolling), this automatically results in weld openings in both the sound-damping blank and the adhesive layer that are aligned with one another. It is also possible to apply adhesive layers to the main blank or to apply adhesive layers to both blanks. Once the adhesive layer has been applied, the sound-damping blank and the main blank are pressed together and the adhesive layer is cured; various known techniques may be used to accomplish this.

Sub-step 116 includes forming the main blank, the adhesive layer and the sound-damping blank together into the vehicle panel assembly. In this embodiment, sub-step 116 is completed after sub-step 114 so that the main blank is formed into the main panel member at the same time as the sound-damping blank is formed into the sound-damping patch. The forming may be accomplished using conventional stamping, drawing, bending, or other metal forming techniques. It should be recognized that step 110 is only exemplary and may include more or less sub-steps than those shown in FIG. 4. For example, one or more spot welds (such as spot welds 30 shown in FIG. 1) may be formed near the periphery or the edges of the sound damping patch to help attach the main blank and the sound-damping blank together so that each blank maintains its position relative to the other during forming sub-step 116. Sub-steps 112-116 may also be performed in a different order. For instance, the individual blanks may be formed separately, as opposed to being integrally formed as one assembly, before adhering or attaching them to one another.

Step 120 includes locating the vehicle panel assembly on the structural member of the vehicle so that the weld opening is aligned with the structural member. Where more than one weld opening is provided, the plurality of weld openings may be aligned with the structural member. In one embodiment, all of the weld openings provided in the adhesive layer and/or sound-damping patch can be aligned with one or more structural members. This is illustrated in FIG. 1, where vehicle panel assembly 10 is aligned with structural member 14 so that the pattern 60 of weld openings follows the shape of the structural member. Locating step 120 may be accomplished by aligning other complimentary or mating features of the vehicle panel assembly and the structural member and/or may be assisted by automated assembly equipment known in the art that can be programmed to locate the panel assembly in a pre-determined location that aligns the weld opening with the structural member. Stated differently, the weld openings may actually be used as alignment features. The main panel member is preferably in contact with or in close proximity to the structural member at the weld opening location or locations upon completion of step 120 to facilitate formation of the weld joints.

Step 130 includes welding the vehicle panel assembly to the structural member of the vehicle with at least one weld joint. The weld joint is located in the weld opening and is formed with material from the main panel member and the structural member. In certain embodiments where the adhesive layer includes a weld opening but the sound-damping patch does not, the weld joint includes material from the sound-damping patch as well. In many instances, however, both the sound-damping patch and the adhesive layer will include one or more weld openings that line up with one another, as demonstrated in FIG. 3. Any number and type of weld joints may be formed in each weld opening, many examples of which are described above.

FIG. 4 illustrates two non-limiting examples of welding step 130, which include optional sub-steps 132, 134 and 132', 134'. One example includes sub-steps 132 and 134 to form a resistance weld joint, while the other includes sub-steps 132' and 134' to form a laser weld joint. In the first exemplary embodiment, welding step 130 includes aligning sub-step 132, in which a welding electrode is aligned with the weld opening so that the welding electrode contacts the main panel member without contacting the sound-damping patch. An illustration of this is provided in FIG. 3. The welding electrode may be circular in cross-section and its center may be brought into general alignment with the center of the weld opening (where the weld opening is circular) or with the longitudinal center of the weld opening (where the weld opening is elongated or slot-shaped, for example). Alignment of the electrode in the weld opening typically occurs before the electrode comes into contact with the main panel member. The electrode may then be moved toward the main panel member so that they contact one another. A force may be applied to the main panel member using the electrode, thereby pressing the main panel member and the structural member together at the intended location of the weld joint. Then, in sub-step 134, electric current is passed through the main panel member and the structural member but not through the sound-damping patch, and a resistance weld joint is formed. Skilled artisans will appreciate that the amount of force and electrical current may vary with the individual application.

One embodiment that includes exemplary steps 132 and 134 may be described with reference again to FIG. 3, which shows a portion of the vehicle panel assembly after formation of the weld joint. In this embodiment, welding electrode 44 is aligned with weld openings 40, 42. Electrode 44 is brought into contact with the main panel member 22, and electrode 46 is brought into contact with structural member 14 from the opposite direction to pinch the structural and panel members 14, 22 together. Electric current is then passed between electrodes 44, 46 and thus through each of the structural and main panel members 14, 22. Electric current is not passed through the sound-damping patch 24 or the adhesive layer 26, however. A resistance spot weld joint 20 is thus formed in the weld openings 40, 42 without burning, vaporizing, or causing outgassing from adhesive layer 26.

Exemplary steps 132 and 134 may also be used to describe other types of weld joints that use electric current to heat the materials to be welded together. For instance, in another embodiment, only a single welding electrode is used in a drawn-arc technique to form the weld joint. In this example, a welding electrode is brought into contact with the main panel member at the weld opening. In the drawn-arc technique, the structural member acts as electrical ground, and the welding electrode is electrically positive. As with resistance spot welding, electric current is passed through the main panel member and the structural member as the positive welding electrode is pulled away from the main panel member to create an electrical arc, thereby localizing the current flow between positive and ground at the weld opening and forming the weld joint. This description of forming resistance weld joints applies to resistance spot welds as well as some types of continuous or elongated weld joints. For instance, the welding electrode or electrodes may be allowed to move along the surface of the main panel member within the weld opening while electric current is applied.

In another embodiment of welding step 130, a laser weld joint may be formed using a method that includes sub-steps 132' and 134'. These sub-steps may be used in addition to or in lieu of sub-steps 132 and 134. In one particular embodiment, welding step 130 includes directing a laser beam at the weld opening in sub-step 132'. The laser beam impinges the main panel member without contacting the sound-damping patch or the adhesive layer. The laser beam may be a typical laser welding beam known in the art with sufficient power to melt the desired materials together. As used herein, the term "laser beam" refers to the portion of a column of laser light that is capable of melting the materials of the main panel member and the structural member when it is focused at the intended location of the weld joint. Skilled artisans will recognize that it may be possible to provide a column of laser light having variable power density across the width of the beam and that some low-power or unfocused laser light could contact the sound-damping patch and/or the adhesive layer without significantly melting either of those components. This type of extraneous laser light that is insufficient to perform a welding operation is not encompassed in the term "laser beam," as used herein.

Typically, the laser beam is directed at the weld opening from the side of the main panel member facing away from the structural member. In other words, the main panel member is the first component the laser beam encounters or impinges along its path. However, the laser beam may be directed at the weld opening from the opposite direction so that the structural member is the first component the laser beam encounters along its path. In one embodiment, laser beams are directed at the weld opening from both sides. Exemplary sub-step 134' includes melting portions of the main panel and structural member together without melting the sound-damping patch so that a laser weld joint is formed. The melting of each member occurs when the laser beam is focused at the main panel member, the structural member, and/or at an interface between the members for a sufficient amount of time, given a particular laser beam power density.

Exemplary steps 132' and 134' as described above may be used to describe various types of laser weld joints. For instance, in one embodiment, the laser beam may be focused at the interface between the main panel member and remain in one location for weld joint formation, thus forming a laser spot weld. In another embodiment, the laser beam and the main panel member may move laterally in relation to each other during weld joint formation to form a continuous or elongated weld (such as weld 20' shown in FIG. 2). Typically, the laser beam moves while the main panel member and structural stay in one place, but it is possible that the members are in motion while the laser beam is fixed in one place or that both the beam and the members are in motion.

Of course, these descriptions of welding step 130 are exemplary in nature. Numerous combinations of individual method steps taken from different embodiments are possible. For example, method 100 may include various welding steps 130 including the formation of both resistance weld joints and laser weld joints. Skilled artisans will also recognize that the same welding electrode or electrodes may be used multiple times sequentially at multiple weld openings to form resistance weld joints at each weld opening. For example, a single pair of resistance spot welding electrodes may be used to form weld joints at each weld opening included in weld opening pattern 60 shown in FIG. 1 by forming a weld joint at one weld opening, aligning with a different weld opening, forming one or more weld joints at the different weld opening, etc.

In typical automotive assembly operations, for example, a pair of opposing spot welding electrodes may be attached to a robotic arm or other computer-controlled machine so that the electrodes can be programmed to form numerous weld joints at pre-determined locations, quickly moving from one pre-determined weld joint location to another. The accuracy of the location of such weld joints depends largely on the repeatability of the position of the components to be welded together. For example, a robotic arm that is programmed to move to a particular location multiple times may do so with very high accuracy and repeatability. But large components such as automobile chassis include their own built-in tolerances so that not every chassis on the assembly line is in the exact same position as it reaches a robotic welding station. Providing vehicle panel assemblies that include weld openings formed in one or more layers of the assemblies may assist with weld joint location repeatability by allowing welding equipment to use the weld openings as locator aids.

For instance, rather than moving welding electrodes or a laser to pre-programmed weld joint coordinates, automated welding equipment may use a feedback system with sensors (e.g., proximity sensors, vision systems, or other types of real-time feedback equipment) to fine-tune the weld joint location based on sensing an edge or other feature of a weld opening and positioning the welding electrodes or laser accordingly. Even a single weld opening in a vehicle panel assembly may be used as a datum for locating the weld joint in a feedback system. Additionally, the local thickness variation in some of the described vehicle panel assemblies that results from the inclusion of the weld openings in the sound damping patch may be useful even where manual spot welding or other welding equipment is employed. By way of example, spot welding electrode tips may be sized and configured to fit into the weld openings, providing positive mechanical positioning for the electrode tips and thus the corresponding weld joints.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle panel assembly, comprising:
a main panel member contacting a structural member of the vehicle and having a first side and a second opposite side;
a sound-damping adhesive layer contacting the main panel member and having a first weld opening;
a sound-damping patch contacting the sound-damping adhesive layer and having a second weld opening that is aligned with the first weld opening; and
a weld joint being at least partially surrounded by the first and second weld openings in the sound-damping layer and the sound-damping patch, wherein the weld joint attaches the vehicle panel assembly to the structural member of the vehicle so that the structural member is located on the first side of the main panel member and the sound-damping patch is located on the second opposite side of the main panel member.

2. The vehicle panel assembly of claim 1, wherein at least one of the sound-damping layer or the sound-damping patch includes a weld opening that accommodates a plurality of weld joints within that one weld opening.

3. The vehicle panel assembly of claim 1, wherein at least one of the sound-damping layer or the sound-damping patch includes a weld opening that is generally circular in shape and accommodates a spot weld.

4. The vehicle panel assembly of claim 1, wherein at least one of the sound-damping layer or the sound-damping patch includes a weld opening that is generally elongated in shape and accommodates a continuous weld.

5. The vehicle panel assembly of claim 1, wherein at least one of the sound-damping layer or the sound-damping patch includes a weld opening that has a dimensional ratio ranging from 1.2 to 5.0, inclusive, where the dimensional ratio represents an inner dimension (W) of the weld opening divided by an outer dimension (W') of a corresponding welding electrode.

6. The vehicle panel assembly of claim 1, wherein the structural member is a structural cross member of the vehicle and the vehicle panel assembly is part of a dash panel.

7. The vehicle panel assembly of claim 1, wherein at least one of the sound-damping adhesive layer or the sound-damping patch includes a plurality of weld openings that are arranged in a pattern that follows the shape of the structural member of the vehicle.

8. The vehicle panel assembly of claim 7, wherein each one of the plurality of weld openings in the pattern accommodates a weld joint that includes material from the structural member of the vehicle and the main panel member without including material from the sound-damping layer.

9. A vehicle panel assembly, comprising:
a main panel member contacting a structural member of the vehicle and having an acoustically active region, the acoustically active region is exposed to a sound source, a vibration source or both;
a sound-damping adhesive layer contacting the main panel member and having a first weld opening;
a sound-damping patch contacting the sound-damping adhesive layer and having a second weld opening that is aligned with the first weld opening, the sound-damping patch covers at least a portion of the acoustically active region; and
a weld joint being at least partially surrounded by the first and second weld openings in the sound-damping layer and the sound-damping patch, wherein the main panel member and the sound-damping patch are both rigid metal components, the sound-damping adhesive layer includes a sound-damping viscoelastic adhesive that adheres the sound-damping patch to the main panel member, and the weld joint attaches the vehicle panel assembly to the structural member of the vehicle.

10. A vehicle panel assembly, comprising:
a main panel member being attached to a structural member of a vehicle and having an acoustically active region, the acoustically active region is exposed to a sound source, a vibration source or both;
a sound-damping layer being adhered to the main panel member and having at least one weld opening, the sound-damping layer covers at least a portion of the acoustically active region of the main panel member;
a sound-damping patch being attached to the main panel member and having a weld opening that is aligned with the weld opening in the sound-damping layer, the sound-damping patch covers at least a portion of the acoustically active region of the main panel member; and
a weld joint being formed in the weld opening of the sound-damping layer and including material from the structural member of the vehicle and the main panel member without including material from the sound-damping layer, wherein the main panel member and the sound-damping patch are both rigid metal components, the sound-damping layer includes a sound-damping viscoelastic adhesive that adheres the sound-damping patch to the main panel member, and the weld joint attaches the vehicle panel assembly to the structural member of the vehicle.

11. The vehicle panel assembly of claim 10, wherein at least one of the sound-damping layer or the sound-damping patch includes a weld opening that accommodates a plurality of weld joints within that one weld opening.

12. The vehicle panel assembly of claim 10, wherein at least one of the sound-damping layer or the sound-damping patch includes a weld opening that is generally circular in shape and accommodates a spot weld.

13. The vehicle panel assembly of claim 10, wherein at least one of the sound-damping layer or the sound-damping patch includes a weld opening that is generally elongated in shape and accommodates a continuous weld.

14. The vehicle panel assembly of claim 10, wherein at least one of the sound-damping layer or the sound-damping patch includes a weld opening that has a dimensional ratio ranging from 1.2 to 5.0, inclusive, where the dimensional ratio represents an inner dimension (W) of the weld opening divided by an outer dimension (W') of a corresponding welding electrode.

15. The vehicle panel assembly of claim 10, wherein the structural member is a structural cross member of the vehicle and the vehicle panel assembly is part of a dash panel.

16. The vehicle panel assembly of claim 10, wherein at least one of the sound-damping layer or the sound-damping patch includes a plurality of weld openings that are arranged in a pattern that follows the shape of the structural member of the vehicle.

17. The vehicle panel assembly of claim 16, wherein each one of the plurality of weld openings in the pattern accommodates a weld joint that includes material from the structural member of the vehicle and the main panel member without including material from the sound-damping layer.

18. A method of attaching a vehicle panel assembly to a structural member of a vehicle, comprising the steps of:
(a) providing a vehicle panel assembly having a metallic main panel member, an adhesive layer including a sound-damping viscoelastic adhesive and a metallic sound-damping patch, wherein at least one of the adhesive layer or the sound-damping patch includes a weld opening;
(b) locating the vehicle panel assembly on the structural member of the vehicle so that the weld opening is aligned with the structural member; and
(c) welding the vehicle panel assembly to the structural member of the vehicle with at least one weld joint, wherein the weld joint is located in the weld opening and is formed with material from the main panel member and the structural member without including material from the adhesive layer.

19. The method of claim 18, wherein step (a) further comprises:
(i) providing a main blank and a sound-damping blank, the sound-damping blank is smaller than the main blank and includes the weld opening;
(ii) applying the adhesive layer to a rear surface of the sound-damping blank so that there is no adhesive in the area of the weld opening, and using the adhesive layer to attach the sound-damping blank to the main blank; and
(iii) forming the main blank, the adhesive layer and the sound-damping blank together into the vehicle panel assembly having the main panel member, the adhesive layer and the sound-damping patch.

20. The method of claim 18, wherein step (c) further comprises:
(i) aligning a welding electrode with the weld opening so that the welding electrode contacts the main panel member without contacting the sound-damping patch; and
(ii) passing electric current through the main panel member and the structural member without passing current through the sound-damping patch so that a resistance weld joint is formed.

21. The method of claim 18, wherein step (c) further comprises:
(i) directing a laser beam at the weld opening so that the laser beam impinges the main panel without contacting the sound-damping patch; and
(ii) melting portions of the main panel and the structural member together without melting the sound-damping patch so that a laser weld joint is formed.

22. The method of claim 18, wherein step (c) further comprises:
(i) using the weld opening as a datum for locating the weld joint in a feedback system; and
(ii) welding the vehicle panel assembly to the structural member of the vehicle with the weld joint.

* * * * *